United States Patent [19]

Shioji

[11] Patent Number: 4,957,351
[45] Date of Patent: Sep. 18, 1990

[54] STEREO IMAGE DISPLAY DEVICE

[75] Inventor: Mitsuaki Shioji, Osaka, Japan

[73] Assignee: Sharp Kabushiki Kaisha, Osaka, Japan

[21] Appl. No.: 347,764

[22] Filed: May 5, 1989

[30] Foreign Application Priority Data

May 10, 1988 [JP] Japan .................................. 63-113806

[51] Int. Cl.$^5$ .............................................. G02F 1/13
[52] U.S. Cl. ................................... 350/348; 350/334; 350/339 R; 350/130; 350/167; 358/3
[58] Field of Search ................... 350/334, 336, 339 R, 350/130, 132, 167, 348; 358/3, 88

[56] References Cited

U.S. PATENT DOCUMENTS

| 3,586,592 | 6/1971 | Cahn | 350/167 X |
| 4,012,116 | 3/1977 | Yevick | 350/167 X |
| 4,737,840 | 4/1988 | Morishita | 358/3 |
| 4,872,750 | 10/1989 | Morishita | 358/3 X |

FOREIGN PATENT DOCUMENTS

| 0001123 | 1/1983 | Japan | 350/132 |
| 0177788 | 9/1985 | Japan | 358/3 |
| 62-77794 | 4/1987 | Japan | . |
| 62-81620 | 4/1987 | Japan | . |
| 62-89925 | 4/1987 | Japan | . |

OTHER PUBLICATIONS

"Sanjigen Eizou to Sanjigen Terebijon (3D Image and 3D Television" Hoso Bunka Kikin.
"Ichi Douki Yomidashi Hoshiki ni yoru Buraunkan Hyouji Ichi Seido no Kaizen" to Sanjigen Eizou Chokusetsu Hyouji heno.
Oyou (Improvement in Accuracy of Display Positions in Cathode Ray Tube et al), University of Tokyo, vol. 37, No. 6.
"Jinbunkatsu Rittaishi no Seiritsu Jouken (Conditions Required to Accomplish Time Sharing Stereoscopic Vision)", pp. 549–555, vol. 41, No. 6 (1987).
"3D Joho no Kiso (Foundations of 3D Information)", pp. 604–609, vol. 41, No. 7, 1987.

Primary Examiner—Stanley D. Miller
Assistant Examiner—Huy K. Mai

[57] ABSTRACT

A stereo display device uses a display unit having a pair of substrates each being formed with a pattern of electrodes and a material filled in a space between the substrates. The material has an electrically controllable optical characteristic for effectuating a display when a voltage is selectively applied to the electrodes on the respective substrates. One of the substrates confronting the viewer is a transparent substrate. The stereo display device also uses a plurality of optical elements formed on a transparent substrate for refracting rays of light incident thereupon, thereby causing travel in different directions as determined by the position at which the rays of light have impinged upon the optical elements. Two image display electrode elements, one associated with the left-hand eye and one with the right-hand eye of the viewer, are formed on the transparent substrate for each optical element.

9 Claims, 2 Drawing Sheets

STEREO IMAGE DISPLAY DEVICE

BACKGROUND OF THE INVENTION

1. Field of the Invention

The present invention generally relates to a stereo image display device, and more particularly, to a device capable of displaying a stereo image of a type which does not require the use of stereo viewing spectacles such as including blue and red filters, polarizing plates or liquid crystal shutters.

2. Description of the Prior Art

Except for a stereoscopic holography in which an image is projected onto a vapor, a cloud or a smoke afloat in the air to form a three-dimension image, all of the conventional stereo image display devices that have been developed or actually used are of a design wherein a two-dimension image is so processed as to permit viewers to perceive the image as a three-dimension image. Those stereo image display devices can generally be classified into two types which make use of monocular movement parallax and binocular parallax, respectively.

The system utilizing the motion parallax is known as a Prooflich system and makes use of such a phenomenon that, when an object in motion is viewed, the closer the object is to the viewer, the swifter the motion is perceived and, conversely, the farther the object is, the slower the motion is perceived. The Prooflich system is, however, not employed in practice because, according to this system, the depth cannot sufficiently be expressed, and depth cannot be perceived with respect to an object in still.

The system utilizing the eye-to-eye parallax is based on a vivid perception of the relative distances of objects in space and requires two images displaced relative to each other so that these two images as viewed by the left-hand and right-hand eyes can interact with each other in stereoscopic vision.

The stereo image display device utilizing the eye-to-eye parallax is available in two models which are known as a binocular stereo display device and a multi-eye stereo display device, respectively. The binocular stereo display device requires the use of spectacles to be worn by a viewer, such as a pair of red and blue glass filters, a pair of polarizing plates or a pair of liquid crystal shutters. More specifically, in the case of the binocular stereo display device requiring the use of the liquid crystal shutters, it is necessary that two images to be viewed by the left-hand and right-hand eyes be displayed on a screen of a cathode ray tube alternately for each field so that the images displayed on the screen of the cathode ray tube can be selectively perceived by both eyes for each field through the liquid crystal shutters.

The binocular stereo display device is effective to avoid such problems associated with the generation of a double image (cross-talk) and the reversal of the images to be viewed by respective eyes, but is inconvenient because of the necessity of use of the viewing spectacles to be worn by viewers.

On the other hand, the multi-eye stereo display device is so designed as to separate the images to be viewed by the respective eyes from each other through the use of a partition plate, known as a parallax barrier, or an array of columnar lens elements known as lenticular sheet. The stereo display device utilizing the parallax barrier is disclosed in, for example, a paper entitled "Rittai Terebi ni Tsuite (Discussion on Stereo Television" and published in NHK Giken Geppou Vol. 3, No. 6 (1960) and Vol. 4, No. 5 (1961) and has a problem in that, since imagewise light emitted from the source of the images is intercepted by the parallax barrier, the aperture efficiency tends to be reduced. The stereo display device utilizing the lenticular sheet was discussed during a session of Hoso Bunka Kikin No. 12th Kenkyu Houkokukai, "Sanjigen Eizou to Sanjigen Terebijon (3D Image and 3D Television)", held on Sept. 21, 1987, the principle of which is shown in FIG. 4 of the accompanying drawings. Referring to FIG. 4, an object 1 is photographed by, for example, five television cameras 2a, 2b, 2c, 2d and 2e from different positions. Respective video outputs from the cameras 2a to 2e are reproduced in synchronized relationship with each other by associated video reproducing apparatii 3a, 3b, 3c, 3d and 3e which are operated in synchronism with each other. These video reproducing apparatii 3a to 3e include cathode ray tubes, and imaged reproduced by these cathode ray tubes are in turn projected, in an enlarged scale, by projectors 4a, 4b, 4c, 4d and 4e onto the lenticular sheet 6 through a Fresnel lens 5. Imagewise light so projected from each of the cathode ray tubes is diffused in all directions through the lenticular sheet 6 and viewers can view the reproduced images from the side of the lenticular sheet 6 opposite the Fresnel lens 5.

The Fresnel lens 5 is used to expand the optical distance between the projectors 4a to 4e and the lenticular sheet 6 longer than the actual distance therebetween. Therefore, with the use of the Fresnel lens 5, the distance between the projectors 4a to 4e and the lenticular sheet 6 can be effectively reduced, permitting the device as a whole to be reduced in size.

As is well known to those skilled in the art, the lenticular sheet 6 has a plurality of elongated lens elements laid parallel to each other in closely adjoining relationship. Imagewise light incident upon the elongated lens elements of the lenticular which has been projected from the projectors 4a to 4e and has subsequently passed through the Fresnel lens 5 emerges outwardly therefrom in different directions at an angle determined by the angle of incidence thereof upon the lenticular sheet 6 In other words, the rays of light protected from the projectors 4a, 4b, 4c, 4d and 4e and subsequently emerging from the lenticular sheet 6 travels along respective optical paths as shown by 1a, 1b, 1c, 1d and 1e. Accordingly, the images carried by light traveling along each adjoining optical paths can fall upon the left-hand and right-hand eyes of the viewer 7, permitting the latter to perceive the three-dimension image.

However, it has been found that, since the plural images projected respectively from the projectors 4a to 4e must be formed on the lenticular sheet 6, the use of the Fresnel lens 5 is essential to guide the images towards the elongated lens elements of the lenticular sheet 6, rendering the device as a whole bulky while the use of the projectors 4a to 4e increases the size. Also, the necessity of the images to be guided by the complicated elongated lens elements lowers the productivity and the reliability, making it difficult to employ the device in practice.

SUMMARY OF THE INVENTION

Accordingly, the present invention is intended to provide an improved stereo image display device which is simple in structure, which does not require the use of any viewing spectacles and which is compact.

In order to accomplish the above described object, an improved stereo display device according to the present invention comprises a display unit comprising a pair of substrates each being formed with a pattern of electrodes, and a material filled in a space between the substrates and having an electrically controllable optical characteristic for effectuating a display when a voltage is selectively applied to the electrodes on the respective substrates. At least one of the substrates confronting a viewer is a transparent substrate.

The stereo display device referred to above also comprises a plurality of optical means formed on the transparent substrate for refracting rays of light incident thereupon so as to travel in different directions determined by the position at which the rays of light have impinged upon the optical means. Two image display electrodes associated with the left-hand and right-hand eyes of the viewer are formed on the transparent substrate for each optical means.

According to the present invention, the transparent substrate is formed with a plural optical device for refracting the incident rays of light in different directions according to the position at which the incident rays of light enters the transparent substrate. For each optical device, the image display electrodes associated, respectively, with the left-hand and right-hand eyes of the viewer are formed, to which signal voltages are applied in correspondence with video signals associated, respectively, with the left-hand and right-hand eyes.

The relationship in position between the image display electrodes and the associated optical device is uniform for the entire optical device, and, therefore, light passing through a portion of the display unit corresponding to the image display electrode associated with the left-hand eye and that passing through a portion of the display unit corresponding to the image display electrode associated with the right-hand eye can be guided to the left-hand and right-hand eyes of the viewer, respectively. Thus, the two separate images displaced relative to each other can be viewed by the viewer permitting the latter to perceive them as a three-dimension image without using any viewing spectacles.

BRIEF DESCRIPTION OF THE DRAWINGS

These and other objects and features of the present invention will become clear from the following description taken in conjunction with a preferred embodiment thereof with reference to the accompanying drawings, in which.

DETAILED DESCRIPTION OF THE INVENTION

Figure 1:
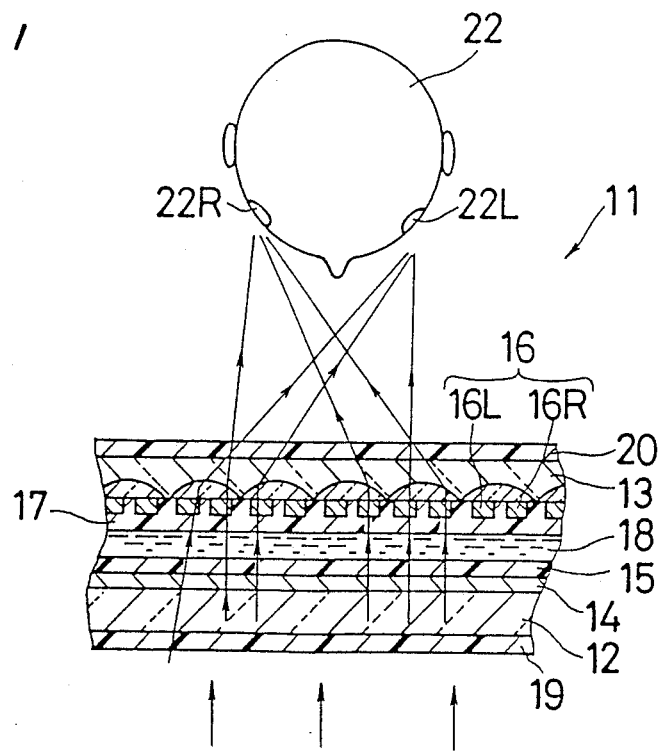
FIG. 1 is a sectional view illustrating a basic structure of a display device according to one embodiment of the present invention.

Before the description of the present invention proceeds, it is to be noted that like parts are designated by like reference numerals throughout the accompanying drawings.

Referring first to FIG. 1 which illustrates a display device 11 according to a preferred embodiment of the present invention, the display device 11 is in the form of a liquid crystal display device of light transmissive type and comprises first and second transparent substrates 12 and 13. The first transparent substrate 12 has on one surface formed a common electrode 14 in the form of a layer of, for example, ITO (Indium-Tin-Oxide). The electrode 14 is in turn covered by an orientation layer 15.

The second transparent substrate 13 is positioned so as to face the orientation layer 15 deposited on the first transparent substrate 12. One of the opposite surfaces of the second transparent substrate 13 adjacent the orientation layer 15 has a plurality of scanning electrodes 16 formed thereon in a predetermined pattern. The second transparent substrate 13 also has an orientation layer 17 deposited on the opposite surface thereof so as to cover the pattern of the scanning electrodes 16. A space between the first and second transparent substrates 12 and 13, particularly between the orientation layers 15 and 17 on the first and second transparent substrates 12 and 13, is filled with a liquid crystal material, for example, a nematic liquid crystal material, to form a liquid crystal layer 18. The other surfaces of the respective first and second transparent substrates 12 and 13 opposite to the associated orientation layers 15 and 17 have respective polarizing plates 19 and 20 deposited thereon or otherwise fitted thereto, thereby completing the twisted nematic liquid crystal display device 11.

Figure 2:
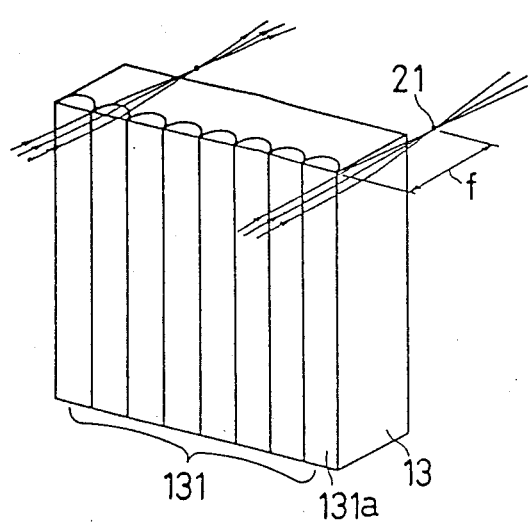
FIG. 2 is a perspective view of one of substrates used in the display device of FIG. 1.

The second transparent substrate 13 is best shown in a perspective representation in FIG. 2. The surface of the second transparent substrate 13 confronting the liquid crystal layer 18 is formed with an array 131 of elongated lens elements laid parallel to each other in close adjoining relationship. The array 131 of the elongated lens elements can be formed by doping ions into the second transparent substrate 13, made of glass, by using a selective diffusion technique (planar technology) so that sodium ions can be substituted by other ions to permit particular areas of the second transparent substrate 13 to have selectively differentiated refraction indexes.

The above described formation of the array 131 of the elongated lens elements can be carried out by immersing, into a solution containing a relatively high concentration of ions to be doped, the second transparent substrate 13 having an attached masking corresponding to the pattern of the elongated lens elements forming the array 131 and then applying a voltage between the second transparent substrate 13 and the solution.

Each elongated lens element 131a forming optical means constituting the array 131 of the elongated lens elements has a predetermined focal length f and parallel rays of light entering such elongated lens element 131a from the surface of the second transparent substrate 13 where the array 131 of the elongated lens elements are formed will converge at a focal point identified by 21. The focal length f of each of the elongated lens elements 131a can be adjusted to a desired value by suitably selecting the type and amount of ions to be doped into the second transparent substrate 13 which are in turn chosen in reference to the relationship in position between the display device 11 and the position of the observer 22. It is to be noted that each of the elongated lens elements 131a may be either a divergent lens element or a convergent lens element. In any event, the rays of light entering each of the elongated lens elements 131a forming the array 131 can be refracted in a desired direction corresponding to the position of incidence of such rays of light.

Thus, by the action of the array 131 of the elongated lens elements, the rays of light emitted from a light source (not shown) travel towards the display device 11 and enter the liquid crystal layer 18 through the first transparent substrate 12 and then emerge outwardly from the display device 11 through the second transparent substrate 13 towards the viewer 22. Specifically, a portion of the rays of light entering each elongated lens element 131a through a left-hand portion thereof with respect to the longitudinal center line of such elongated lens element 131a is refracted so as to converge at the left-hand eye 22L of the viewer 22 while a portion of the rays of light entering the same lens element 131a through a right-hand portion with respect to the longitudinal center line thereof is refracted so as to converge at the right-hand eye 22R of the same viewer 22.

As best shown in FIG. 1, each of the scanning electrodes 16 is constituted by a pair of scanning electrode elements 16L and 16R for each of the elongated lens elements 131a. The scanning electrode elements 16L in all the scanning electrodes 16 are adapted to receive a signal voltage in correspondence with an image signal for the presentation of an image to the left-hand eye 22L, whereas the scanning electrode elements 16R in all the scanning electrodes 16 are adapted to receive a signal voltage in correspondence with an image signal for the presentation of an image to the right-hand eye 22R. The paired scanning electrode elements 16L and 16R of each scanning electrode 16 is positioned on respective sides of the associated elongated lens element 131a with respect to the longitudinal center line thereof, that is, leftwardly and rightwardly of the associated elongated lens element 131a in a direction perpendicular to the direction of incidence of rays of light.

The liquid crystal layer 18 has such an optical characteristic as to be variable depending on the voltage applied selectively between the scanning electrodes 16 and the common electrode 14. Accordingly, although at a portion of the liquid crystal layer 18 corresponding to each scanning electrode element 16R the liquid crystal layer 18 is driven in correspondence with an image signal for the presentation of the image to the right-hand eye 22R, the rays of light modulated by such portion of the liquid crystal layer 18 is directed towards the right-hand eye 22R of the viewer 22. A similar description can apply to each scanning electrode element 16L associated with the left-hand eye 22L, and therefore, the two separate images can fall on the right-hand and left-hand eyes 22R and 22L of the viewer 22, causing the viewer 22 to perceive them as a three-dimension image.

Figure 3:
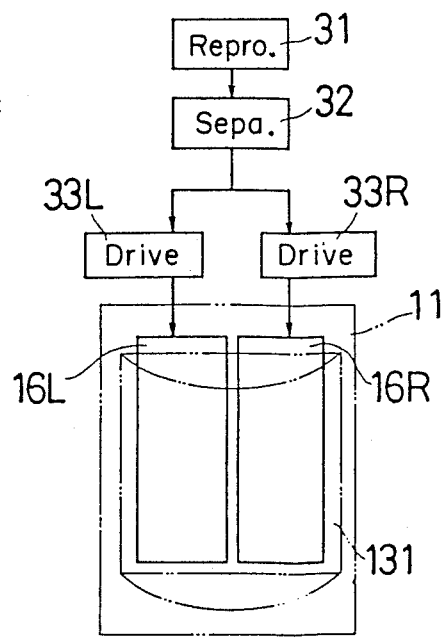
FIG. 3 is a schematic block circuit diagram showing an electric drive system for driving the display device of FIG. 1.
Figure 4:
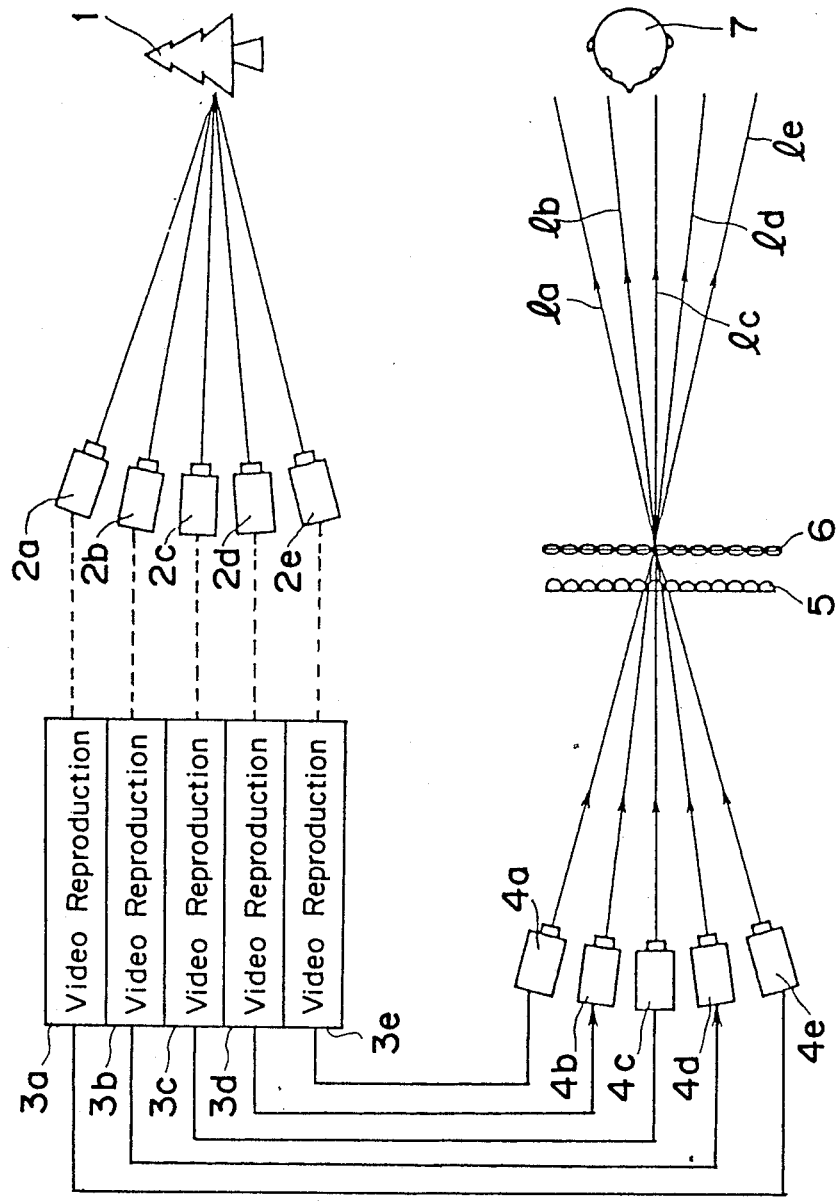
FIG. 4 is a schematic diagram showing the principle of the prior art stereo image display system.

FIG. 3 illustrates a block diagram showing a drive system for driving the display device 11 to effect a display of the two separate images. An output from a reproducing apparatus 31, such as, for example, a video disc player is supplied to a separator 32. The reproducing apparatus 31 may be of a type adapted to be loaded with a video carrier medium, such as, for example, a video disc, and a video signal recorded on the video carrier medium is supplied from the reproducing apparatus 31 to the separator 32.

The video carrier medium has a video signal recorded thereon, which video signal may be composed of image signals for the presentation of respective images to the left-hand and right-hand eyes 22L and 22R which are selectively switched for each field. Accordingly, the separator 32 is operable to separate those image signals for the presentation of the respective images to the left-hand and right-hand eyes 22L and 22R from each other, the separated image signals being subsequently supplied to respective drive circuits 33L and 33R. In other words, the image signal for the presentation of the image to the left-hand eye 22L and the image signal for the presentation of the image to the right-hand eye 22R are respectively supplied to the drive circuits 33L and 33R.

The drive circuit 33R supplies to the scanning electrode elements 16R a signal voltage corresponding to the image signal for the presentation of the image to the right-hand eye 22R, while the drive circuit 33L supplies to the scanning electrode elements 161 a signal voltage corresponding to the image signal for the presentation of the image to the left-hand eye 22L. In this way, the display device 11 can be driven to effect a display in correspondence with the image signals for the presentation of the respective images to the left-hand and right-hand eyes.

In the illustrated embodiment described above, the array 131 of the elongated lens elements 131a is formed by doping the ions into the second transparent substrate 13. For each elongated lens element 131a, the paired scanning electrode elements 16R and 16L to which the signal voltages corresponding to the image signals for the presentation of the images to the right-hand and left-hand eyes are applied are disposed. The rays of light entering a portion corresponding to the scanning electrode elements 16R and 161 are refracted so as to converge at the right-hand and left-hand eyes 22R and 22L of the viewer 22. Accordingly, since the two separate images fall on the right-hand and left-hand eyes of the viewer 22, the viewer can perceive them as a three-dimension image.

The use of the liquid crystal display device which can be assembled relatively compact in the way as described above makes it possible to manufacture the stereo image device, and with the display device 11 according to the present invention, the viewer 22 can enjoy viewing the three-dimension image without wearing the viewing spectacles. Therefore, the display device 11 can be assembled to be portable and transportable, and since no complicated lens array is employed, the productivity and the reliability can be advantageously increased.

As fully described above, according to the present invention, the three-dimension image can be viewed with a simplified structure and with no need to wear the viewing spectacles. Accordingly, not only can the manufacturing cost be reduced considerably, but also the reliability of the device can be increased considerably. Also, the stereo image display device according to the present invention can be fabricated compact enough to permit it to be portable.

Although the present invention has been fully described in connection with the preferred embodiments thereof with reference to the accompanying drawings, it is to be noted that various changes and modifications are apparent to those skilled in the art. For example, although in the foregoing embodiment reference has been made to the liquid crystal display device of light transmissive type, the present invention can be equally applicable to the liquid crystal display device of light reflective type and, in such case, a reflecting plate is required to be placed on one side of the polarizing plate 19 remote from the first transparent substrate 12.

Also, in association with the paired scanning electrode elements 16R and 16L for each elongated lens element 131a of the lens array 131, red, green and blue color filters may be disposed to effect a so-called full color display.

Moreover, although the foregoing description has been made in connection with the use of the liquid crystal display device, it should be understood that the present invention can be equally applicable to a flat display panel such as, for example, an EL (electro luminescence) display device or a plasma display device.

Accordingly, such changes and modifications are to be understood as included within the scope of the present invention as defined by the appended claims unless they depart therefrom.

What is claimed is:

1. A stereo display device, having a display unit, comprising:
    a pair of substrates;
    a pattern of electrodes being formed on each substrate;
    a material filled in a space between said substrates having an electrically controllable optical characteristic for effectuating a display when a voltage is selectively applied to said electrodes on said substrates;
    at least one of said substrates confronting a viewer being a transparent substrate; and
    plural optical means for refracting rays of light incident thereupon so that the rays of light travel in different directions determined by a position of the incidence of such rays of light;
    said transparent substrate having each optical means formed therein;
    said pattern of electrodes on said transparent substrate having a plurality of pairs of display electrode elements, each pair of display electrode elements having a single display electrode element associated with a left eye of a viewer and a single display electrode element associated with a right eye of a viewer;
    each said optical means being formed on said transparent substrate such that each said optical means is positioned contiguously to each said pair of display electrode elements.

2. The device as claimed in claim 1, wherein said material is a liquid crystal material.

3. The device as claimed in claim 1 wherein said optical means comprises a lens element formed by an ion doping process.

4. The device as claimed in claim 1 wherein each said substrate is transparent.

5. A display device for displaying an image stereoscopically, comprising:
    a first substrate;
    a second substrate;
    a pattern of electrodes formed on said first substrate;
    a common electrode formed on said second substrate;
    a material sandwiched between said first and second substrates having an electrically controllable optical characteristic for effecting a display when a certain voltage is selectively applied across an electrode in said pattern of electrodes and said common electrode;
    plural optical means for refracting rays of light incident thereupon such that the rays of light travel in different directions determined by a position of incidence of the rays of light;
    a first polarizer formed on a surface of said first substrate opposite said material; and
    a second polarizer formed on a surface of said second substrate opposite said material;
    said first substrate having each said optical means formed therein;
    said pattern of electrodes forming a plurality of pairs of display electrode elements on said first substrate, each pair of display electrode elements having a single display electrode element associated with a left eye of a viewer and a single display electrode element associated with a right eye of a viewer;
    each said pair of display electrode elements being contiguously positioned on a respective optical means.

6. The device as claimed in claim 5 wherein said first substrate is transparent.

7. The device as claimed in claim 5 wherein said first and second substrates are transparent.

8. The device as claimed in claim 5 wherein said material is a liquid crystal material.

9. The device as claimed in claim 5 wherein said certain voltage has a zero voltage level.

* * * * *